United States Patent
Alpine

[15] 3,638,972
[45] Feb. 1, 1972

[54] BRANCH PIPE FITTING FOR FLUID PRESSURE PIPELINE

[72] Inventor: Albert Earl Alpine, Norristown, Pa.
[73] Assignee: Certain-Feed Products Corporation, Ardmore, Pa.
[22] Filed: Nov. 4, 1969
[21] Appl. No.: 873,831

[52] U.S. Cl. ........................285/156, 285/197, 285/230
[51] Int. Cl. ..................................................F16l 41/00
[58] Field of Search...............285/156, 230, 197, 190, 373, 285/198, 199

[56] References Cited

UNITED STATES PATENTS

| | | | |
|---|---|---|---|
| 1,206,670 | 11/1916 | Chamberlin | 285/156 X |
| 1,791,385 | 2/1931 | Skuttle | 285/197 X |
| 2,943,868 | 7/1960 | Hanback | 285/190 X |
| 3,186,741 | 6/1965 | Kurtz | 285/230 X |
| 2,985,435 | 5/1961 | Gross | 285/373 X |

FOREIGN PATENTS OR APPLICATIONS

| | | | |
|---|---|---|---|
| 86,776 | 1/1959 | Denmark | 285/156 |
| 964,683 | 7/1964 | Great Britain | 285/156 |
| 388,044 | 5/1961 | Switzerland | 285/197 |
| 48,270 | 6/1966 | Germany | 285/156 |

Primary Examiner—Thomas F. Callaghan
Attorney—Synnestvedt & Lechner

[57] ABSTRACT

The device disclosed includes a conduit piece adapted to be connected into a pipeline and having an aperture in the sidewall for a branch connection, and a circumferentially unbroken and apertured sleeve surrounding the apertured portion of the circuit piece, with circumferentially unbroken packing rings between the sleeve and conduit piece at opposite sides of the apertures, providing for pressure equalization inside and outside of the conduit piece in the region of the connection.

1 Claims, 4 Drawing Figures

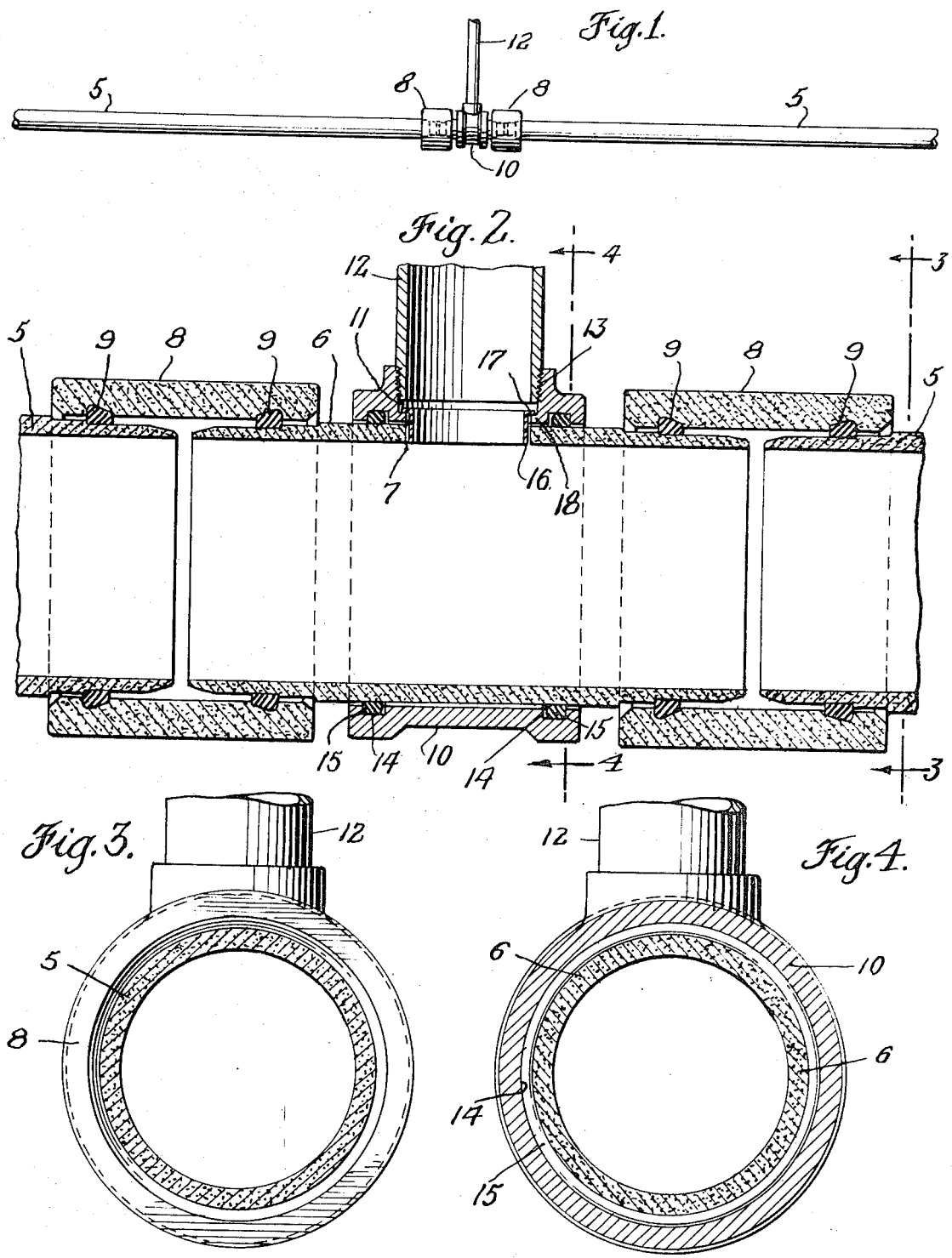

BRANCH PIPE FITTING FOR FLUID PRESSURE PIPELINE

This invention relates to branch pipe fittings for fluid pressure pipelines. While the invention is usable in pipelines where the pipe is formed of a variety of different materials, the invention is of special advantage with certain types of pipe, particularly asbestos-cement pipe. Moreover, while the invention is applicable to the making of branch pipe connections to pipelines provided for various purposes, it is particularly useful in connection with pipelines carrying liquids under pressure, for instance water-supply pipelines.

For purposes of illustration and explanation, the invention is described with particular reference to a branch connection fitting adapted for use with asbestos-cement water pipelines.

Various systems are known for making branch connections to asbestos-cement waterlines. For example, it is known to provide an aperture in the pipe wall and position a metal, for instance brass, insert in the aperture, the insert having a threaded aperture with which the branch pipe is connected. Direct pipe taps have also been used, where the tap is directly threaded into an aperture in the wall of the pipe. However, these prior arrangements are subject to a number of difficulties and disadvantages, in consequence of which they may be used only up to a relatively small branch pipe diameter, for instance of the order of 1½ inches or 2 inches with a pipeline of 8 inches to 12 inches in diameter. Even when limited to relatively small diameters, such prior arrangements seriously impair the hoop strength of the pipe to which the branch connection is being made.

With various types of metal pipelines it has also been known to provide a branch connection by clamping a split sleeve upon the pipe, the sleeve having an aperture for the branch connection, and providing a branch connection aperture in the pipe in registry with the branch aperture in the sleeve. Arrangements of this kind are likewise subject to serious disadvantages, especially in any attempt to apply such split fittings to pipelines made of certain materials, such as asbestos-cement. One such disadvantage lies in the fact that the tightening of the split sleeve, as by means of fastening bolts, may well result in crushing or at least damage to the pipe. This difficulty is aggravated by the fact that the outside barrel of asbestos-cement pipe is not ordinarily manufactured to as close dimensional tolerances as a machined surface.

Another serious disadvantage with the type of fitting employing a split sleeve is that the sealing necessarily provided between the inside of the sleeve and the outside of the pipe is difficult to achieve because it is not only necessary to effect a seal between the internal and external cylindrical surfaces of the sleeve and pipe, but also between the adjacent or abutting surfaces of the split in the sleeve, these latter surfaces ordinarily lying in a plane containing the axis of the pipe. Moreover, in at least many such split sleeve arrangements it is necessary also to provide circumferential packing elements which are likewise split or of multipart construction, rather than in the form of circumferentially unbroken rings, in view of which the sealing problem is further aggravated.

Having the foregoing in mind, it is a major objective of the present invention to provide a fitting or connection means for establishing a branch connection with a fluid pressure pipeline in which difficulties and disadvantages of the types mentioned above are eliminated. This is accomplished in accordance with the present invention by the provision of a fitting preferably comprising a short conduit piece adapted to be serially connected into the pipeline and having a branch connection aperture in the sidewall, together with a sleeve surrounding the conduit piece and having a branch pipe aperture in registry with the aperture in the conduit piece, sealing rings being positioned between the conduit piece and sleeve at opposite sides of the apertures. With this arrangement the internal pressure within the pipeline has access to the exterior surface of the conduit piece in the region lying between the spaced sealing rings and thereby equalizes the pressure between the inside and the outside of the conduit piece in the region of the branch connection aperture. With the internal and external pressure thus equalized, the provision of the aperture in the conduit piece is not of consequence to the effective strength of the conduit piece. Thus, while the cutting of a 4-inch diameter hole in the wall of a 8-inch diameter asbestos-cement pipe reduces the hoop strength of the pipe to about one-half of its original value, this loss in strength can be substantially completely compensated for by equalization of the internal and external pressure on the pipe.

Having in mind that the sleeve must also be apertured for the branch pipe connection, the invention contemplates use of a sleeve of greater hoop strength than that of the conduit piece to which it is applied, so that notwithstanding the presence of the aperture in the sleeve, the sleeve will have sufficient hoop strength to withstand the internal pressure to which it is subjected in consequence to equalization of the pressure between the inside and the outside of the conduit piece.

Another objective of the invention is to improve and simplify the sealing arrangements between the sleeve and the conduit piece, and this is accomplished by providing a circumferentially unbroken sleeve (rather than a split sleeve), and also by providing circumferentially unbroken packing rings between the sleeve and the conduit piece.

How the foregoing objectives and advantages of the invention are achieved will appear more fully from the following description referring to the accompanying drawing, in which:

FIG. 1 is a small scale elevational view of a pipeline in which a branch connection fitting according to the present invention is inserted;

FIG. 2 is an enlarged longitudinal sectional view through a branch connection fitting according to the invention, this view illustrating portions of the adjoining sections of pipe between which the fitting is serially connected;

FIG. 3 is a transverse sectional view taken as indicated by the line 3—3 on FIG. 2; and FIG. 4 is a transverse sectional view taken as indicated by the line 4—4 on FIG. 2.

Referring to the drawing, the numeral 5 indicates sections of a pipe making up a pipeline and with which the fitting of the present invention is shown as being serially interconnected. In the embodiment illustrated, see particularly FIG. 2, the fitting comprises a short section of pipe or conduit piece 6 having its opposite ends open and presented toward the adjacent ends of the pipe sections 5. The conduit piece 6 also has an aperture 7 in its sidewall serving as the aperture through which the branch connection may communicate with the interior of the pipe.

As above indicated, it is here assumed that the pipeline is formed of asbestos-cement pipe sections, and the conduit piece 6 similarly is advantageously formed of asbestos-cement material. The conduit piece may be interconnected in the pipeline when the pipeline is under construction by means of couplings of known type, for example, couplings including sleeve 8 formed of asbestos-cement materials and having internal grooves for receiving packing rings 9, desirably rubber rings, which are adapted to seal the space between the sleeve 8 and the adjacent ends of the pipe sections 5 and conduit piece 6.

The fitting of the invention further includes a sleeve 10, this sleeve being circumferentially unbroken as appears in FIG. 4. In the preferred embodiment when used with asbestos-cement pipe, the sleeve 10 is made of cast iron. The sleeve 10 has an aperture 11 adapted to register with the aperture 7 in the wall of the conduit piece 6 and thus provide for connection of the branch pipe 12 with the interior of the conduit piece 6 and thus with the pipeline. The connection between the branch pipe 12 itself and the sleeve 10 may be effected in any of a variety of ways, such as the threaded connection 13 shown in FIG. 2, or a "push-on" or a flanged connection, or by using an epoxy adhesive.

Interiorly, the sleeve 10 is provided with grooves 14 for receiving the packing rings 15 which are spaced from each other axially of the pipeline and which are located at opposite sides of the apertures 7 and 11 in the conduit piece and sleeve.

As seen in FIG. 4, these rings 15 are circumferentially unbroken and provided an effective pressure seal between the inside of the sleeve and the external surface of the conduit piece 6.

The dimensions of the conduit piece and sleeve are such that the sleeve is in effect "floating" on the packing rings, with clearance between the conduit piece and sleeve so that the internal pressure within the pipe has ready access to the clearance space in order to provide for equalization of the pressure on the inside and outside of the conduit piece.

Although it may not always be needed, a positioning element may be employed for maintaining the sleeve 10 and the conduit piece 6 in such relative rotational positions as to ensure registry of the apertures 7 and 11 in the conduit piece and sleeve, and thus and thus ensure free flow from the conduit into the branch connection 12. In the embodiment illustrated, this positioning element takes the form of a ring or ferrule 16 having a flange 17 at one overlying the shoulder 18 surrounding the aperture 11. This ferrule may be inserted before inserting the branch pipe 12 and the branch pipe may serve to retain the ferrule as against dislodgement. The ferrule 16 is dimensioned so as not to interfere with the free communication between the interior of the conduit piece and the annular clearance space within the sleeve, which is necessary for establishment of the pressure equalization on the inside and outside surfaces of the conduit piece.

As above indicated, in the illustrative embodiment, it is assumed that the fitting of the invention is inserted into an asbestos-cement pipeline employed, for example, in a water supply system. In such an installation, conduit pieces 6 to be used for branch fittings may readily be provided by cutting up asbestos-cement pipe sections of the same kind used for the pipeline. Preferably the end portions of the conduit piece are machined or shaped to conform with the shape desired in the couplings employed between sections of the pipeline. In this way the same coupling and sealing arrangements may by employed with the fitting, as with the pipe section themselves.

For an installation of the kind just referred to, it is also preferred to form the fitting sleeve 10 of cast iron, although other materials can be used. The important consideration here is that the sleeve 10 should have hoop strength greater than that of the conduit piece, so that the sleeve even when provided with the aperture for the branch connection will have adequate strength to withstand the internal pressure to which it is subjected in the region between the sealing rings 15 in consequence of the equalization of pressure between the inside of the conduit or pipeline and the outside surface of the conduit piece between those sealing rings.

In a typical case, where a 4-inch aperture is provided in the conduit piece in order to provide for connection of a 4-inch diameter branch pipe, the cutting of the aperture in the conduit piece will reduce the hoop strength of the conduit piece by about 50 percent. In order to maintain the desired hoop strength, the hoop strength of the sleeve 10 must be greater than that of the conduit piece itself, so that, notwithstanding the aperture in the sleeve, the sleeve will still have a hoop strength at least equal to the rated value for the conduit or pipeline.

For the purpose of providing the desired hoop strength, the sleeve may be formed of stronger material than the material of the conduit piece, for instance the sleeve may be formed of cast iron where it is employed with an asbestos-cement conduit piece. If formed of cast iron, the sleeve wall would not then necessarily be of greater thickness than the thickness of the wall of the conduit piece. On the other hand it is possible to make the sleeve of the same material as the conduit piece, for instance asbestos-cement material, but in this case it would be necessary to employ a sleeve of greater wall thickness.

It will be understood, therefore, that the references herein to employment of a sleeve of greater hoop strength than that of the conduit piece, contemplate either the use of stronger materials, or the use of a thicker sleeve wall, or both.

The branch pipe may be formed of any suitable material, a steel pipe being typical.

Although the specific embodiment illustrated and described utilizes the fitting of the invention in an asbestos-cement pipeline, it will be understood that the invention may be used in pipelines where the pipe is formed of other materials, an example of which is polyvinyl chloride pipe.

With the "floating" sleeve of the invention, i.e., the sleeve mounted upon the conduit piece only by engagement with the sealing rings, so as to provide pressure equalization between the inside and outside of the conduit piece, it is practical to provide for connection of branch pipes of a wide range of sizes running up to a diameter equal to the diameter of the conduit or pipeline itself.

The arrangement of the invention, including especially the circumferentially unbroken sleeve having the "floating" mounting upon the conduit piece, provides for making branch pipe connections without resorting to any clamping action, as was frequently heretofore used where split sleeves were applied to pipelines. Additionally, the employment of a circumferentially unbroken sleeve and also of circumferentially unbroken sealing rings provide a very simple but reliable sealing arrangement.

The arrangement of the invention, moreover, is especially well adapted to use with pipelines, such as asbestos-cement pipelines, in which the outside barrel of pipe sections are not ordinarily manufactured to as close dimensional tolerances as a machined surface, the "floating" action provided by the fitting of the invention being adequate to compensate for dimensional variations.

I claim:

1. A device for use in establishing a branch connection with an asbestos-cement fluid pressure pipeline, comprising an asbestos-cement conduit piece having substantially the same cross-sectional dimensions as those of said pipeline, the conduit piece having its opposite ends open to provide for series connection of the device in the pipeline and further having a branch connection aperture in the sidewall of the conduit piece intermediate the open ends, a sleeve piece surrounding the apertured portion of the conduit piece, the sleeve piece having an aperture for cooperation with a branch pipe and providing a passage in communication with the interior of the conduit piece through the aperture in the sidewall thereof, ferrule extended into both the aperture in the conduit pieces and the aperture in the sleeve piece and providing for maintaining said apertures in registration with each other, the sleeve piece having grooves for accommodating packing rings lying in transverse planes between the aperture in the conduit piece and the open ends of the conduit piece, and circumferentially unbroken packing rings in said grooves, the inside diameter of the sleeve piece in the region between the packing rings being sufficiently large in relation to the outside diameter of the conduit piece to provide clearance for equalization of the fluid pressure inside and outside of the conduit piece in the region between said packing rings, the sleeve piece being formed of metal and having greater hoop strength than the asbestos-cement material of the conduit piece.

* * * * *